United States Patent
Kuboki

Patent Number: 5,812,154
Date of Patent: Sep. 22, 1998

[54] INK JET RECORDING APPARATUS FOR DETERMINING A TIMING FOR A RECORD SCAN IN ACCORDANCE WITH A TIME REQUIRED TO TRANSFER ONE BAND OF DATA, AND RECORDING THE IMAGE DATA

[75] Inventor: Keiju Kuboki, Yokohama, Japan

[73] Assignee: Canon Kabushiki Kaisha, Tokyo, Japan

[21] Appl. No.: 348,135

[22] Filed: Nov. 23, 1994

[30] Foreign Application Priority Data

Nov. 26, 1993 [JP] Japan .................................. 5-296831

[51] Int. Cl.⁶ .................................................. B41J 29/38
[52] U.S. Cl. .................................. 347/5; 347/14; 395/115
[58] Field of Search .......................... 347/5, 9, 14, 247, 347/237, 43, 37; 358/524, 404, 412, 296; 395/115

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,965,593 | 10/1990 | Hickman ............................. 347/37 |
| 4,975,780 | 12/1990 | Kuboki . |
| 5,172,238 | 12/1992 | Kuboki . |

FOREIGN PATENT DOCUMENTS

| | | |
|---|---|---|
| 54-056847 | 5/1979 | Japan . |
| 54-059936 | 5/1979 | Japan . |
| 59-123670 | 7/1984 | Japan . |
| 59-138461 | 8/1984 | Japan . |
| 60-071260 | 4/1985 | Japan . |

Primary Examiner—Benjamin R. Fuller
Assistant Examiner—Craig A. Hallacher
Attorney, Agent, or Firm—Fitzpatrick, Cella, Harper & Scinto

[57] ABSTRACT

One band of color image is recorded by scanning color recording heads of Y, M, C and K colors having a predetermined recording width by a carriage in a main scan direction, and four times of scans are conducted by the respective color recording heads during the transfer of the next band of image data. The interval of each scan is calculated based on the transfer time of one band of image data and the respective colors are scanned at the timing corresponding to the calculated interval.

Thus, when one band of image is recorded on a recording medium by scanning the recording head having the predetermined recording width a plurality of times in the main scan direction, a high quality image can be recorded without lowering a throughput.

13 Claims, 7 Drawing Sheets

INK JET RECORDING APPARATUS FOR DETERMINING A TIMING FOR A RECORD SCAN IN ACCORDANCE WITH A TIME REQUIRED TO TRANSFER ONE BAND OF DATA, AND RECORDING THE IMAGE DATA

BACKGROUND OF THE INVENTION

1. Field of the Invention

The present invention relates to an ink jet recording apparatus which records an image on a recording medium by scanning ink jet recording means of a predetermined width a plurality of times in a main scan direction.

2. Related Background Art

In an image forming apparatus for recording an image on a recording medium such as a recording sheet by scanning a recording head, a plurality of recording elements (heat generating elements or ink jet nozzles) are arranged in a direction (sub-scan direction) perpendicular to a scan direction (main scan direction) of the recording head, and one band (a width recordable by one scan of the recording head in the main scan direction) of image is recorded by scanning the recording head in the main scan direction. After the scan in the main scan direction, the recording head is scanned in the sub-scan direction to form an image of the next band.

The image is formed in this manner.

When a color image is to be formed, such recording heads are arranged in the main scan direction for four colors c, m, y and k.

Recently, a method for recording an image from an external computer by providing an interface in the image forming apparatus has been widely used. Since an image transfer rate from the computer and a recording speed of the image forming apparatus are significantly different from each other, it is essential to provide a buffer memory therebetween. The image forming apparatus need not necessarily have a memory of a full screen image but may have a one-band image memory as shown in FIG. 8 and one band of image may be formed after one band of image is transferred in order to significantly save a buffer memory size.

In the past, the recording medium is mostly paper, but recently the printing on a special recording medium such as an OHP sheet is required. In such a special recording medium, since an absorption factor of ink is lower than that of a paper, the ink may overflow or ink droplets are condensed to cause problems such as a beading when it is attempted to print a large amount of ink at a time.

As an approach to solve the problem, it has been proposed to print one band of image for each color in a plurality of scans. Thus, the amount of ink implantation in one scan can be reduced and the above problems are resolved.

However, in such color image recording, it is not always an optimum process to conduct the scan immediately following the completion of the previous scan. In actuality, it may be better that a time from the first scan to the second scan is long to some extent. In the CG (computer graphic) image from the computer, many solid areas may be included. Thus, when the above method is simply applied, the overflow of the ink or the beading may occur. However, when the interval is simply extended, a throughput to form the image is lowered.

SUMMARY OF THE INVENTION

It is an object of the present invention to provide an improved ink jet recording method and apparatus.

It is another object of the present invention to provide an ink jet recording method and an apparatus which permit the formation of a high quality image without lowering a throughput of image recording.

It is still another object of the present invention to provide ink jet recording method and apparatus which conduct a plurality of record scans for recording a current band during the transfer of the image data of the next band at an appropriate timing in accordance with a transfer time of the one band of image data.

It is still another object of the present invention to provide ink jet recording method and apparatus which record one band of image on a recording medium by record scanning ink jet recording means of a predetermined width a plurality of times in the main scan direction, and which record one band of image in parallel with the transfer of a next band of image data and conduct each record scan in recording one band of image in a time interval allotted in accordance with a time required to transfer the one band of image.

The above and other objects of the present invention will be apparent from the accompanying drawings and the following description.

DETAILED DESCRIPTION OF THE PREFERRED EMBODIMENTS

Figure 1:
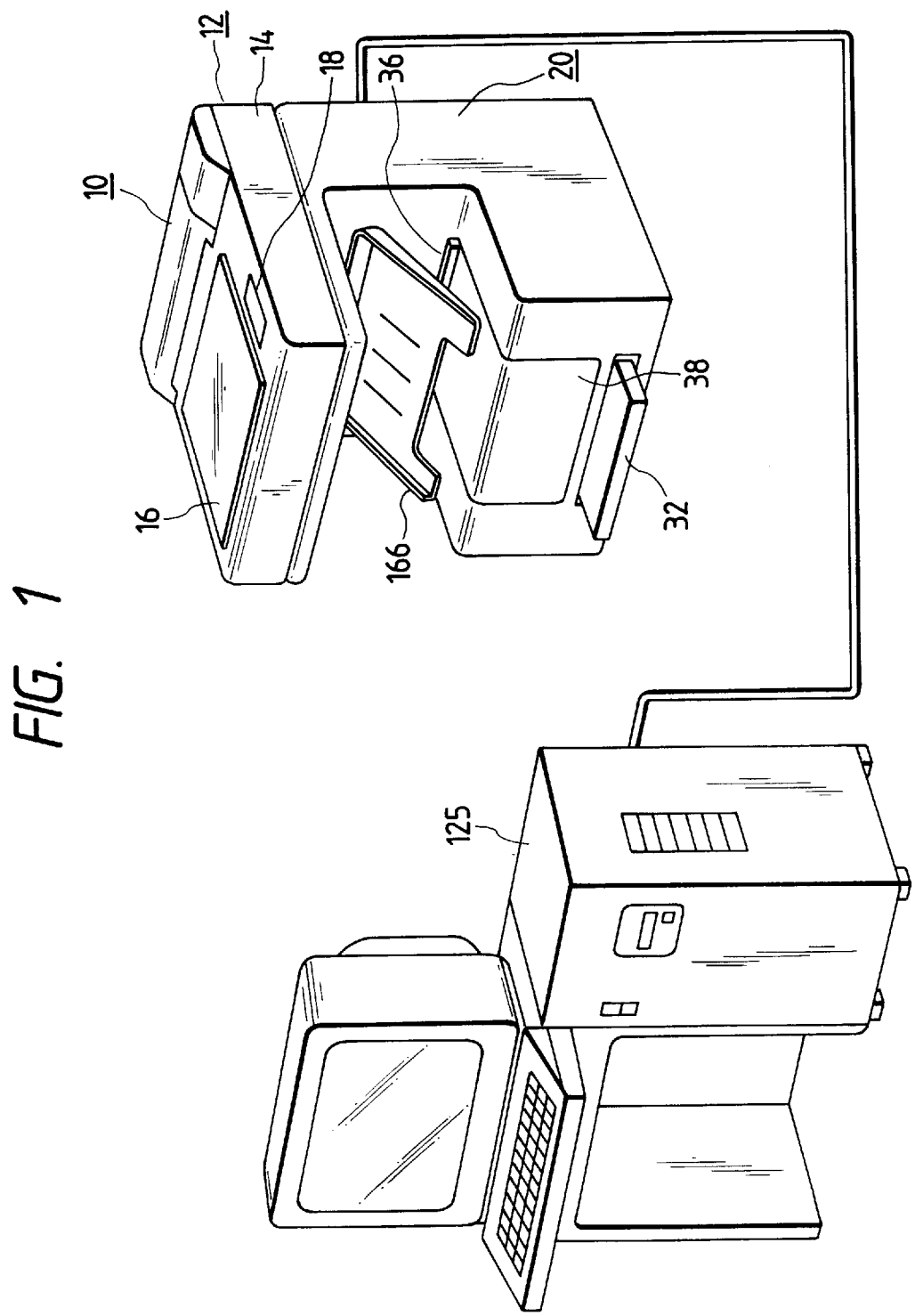
FIG. 1 shows an external view of a digital color copying apparatus and a computer connected thereto.

FIG. 1 shows an external view of a digital color copying apparatus of an embodiment of the present invention and a computer connected thereto.

The digital color copying apparatus comprises two major elements. A first element includes a color image scanner (hereinafter referred to as a reader) 12 arranged at the top. The reader 12 reads an image of a document sheet in color and outputs digital color image data. The reader 12 includes a control unit 14 which conducts various image processing of the digital color image data and has a process function such as an interface with an external unit. A second major element is a printer 20 which is arranged below the reader 12 and records a color digital image signal outputted from the control unit 14 of the reader 12 onto a recording sheet.

The reader 12 also includes a mechanism for reading image information from the document sheet arranged in face-down manner on a document sheet table, not shown, under a document sheet retainer (or document sheet pressing plate) 16. The document sheet is of various shapes and sizes such as three-dimensional or sheet-like, or large size document sheet. A console unit (or operation unit) 18 connected to the control unit 14 is provided on the top side of the reader 12. The console unit 18 allows entry of various information and operational commands to the copying apparatus. The control unit 14 is configured to command the operation of the reader 12 and the printer 20 in accordance with the information inputted through the console unit 18. When a complex edit operation is required, a digitizer may be attached in place of the document sheet retainer 16 and it may be connected to the control unit 14 to permit the complex image processing.

On the other hand, in the printer 20 of the present embodiment, a full color ink jet printer which uses a recording head of an ink jet recording system using thermal energy as disclosed in Japanese Laid-Open Patent Application No. 54-59936 is used. The above two major elements are separable from each other and may be located at distant places by extending a connection cable.

The reader 12 has an interface (I/F) such as GPIB or SCSI and connected to a computer 125 through an I/F cable.

Figure 2:
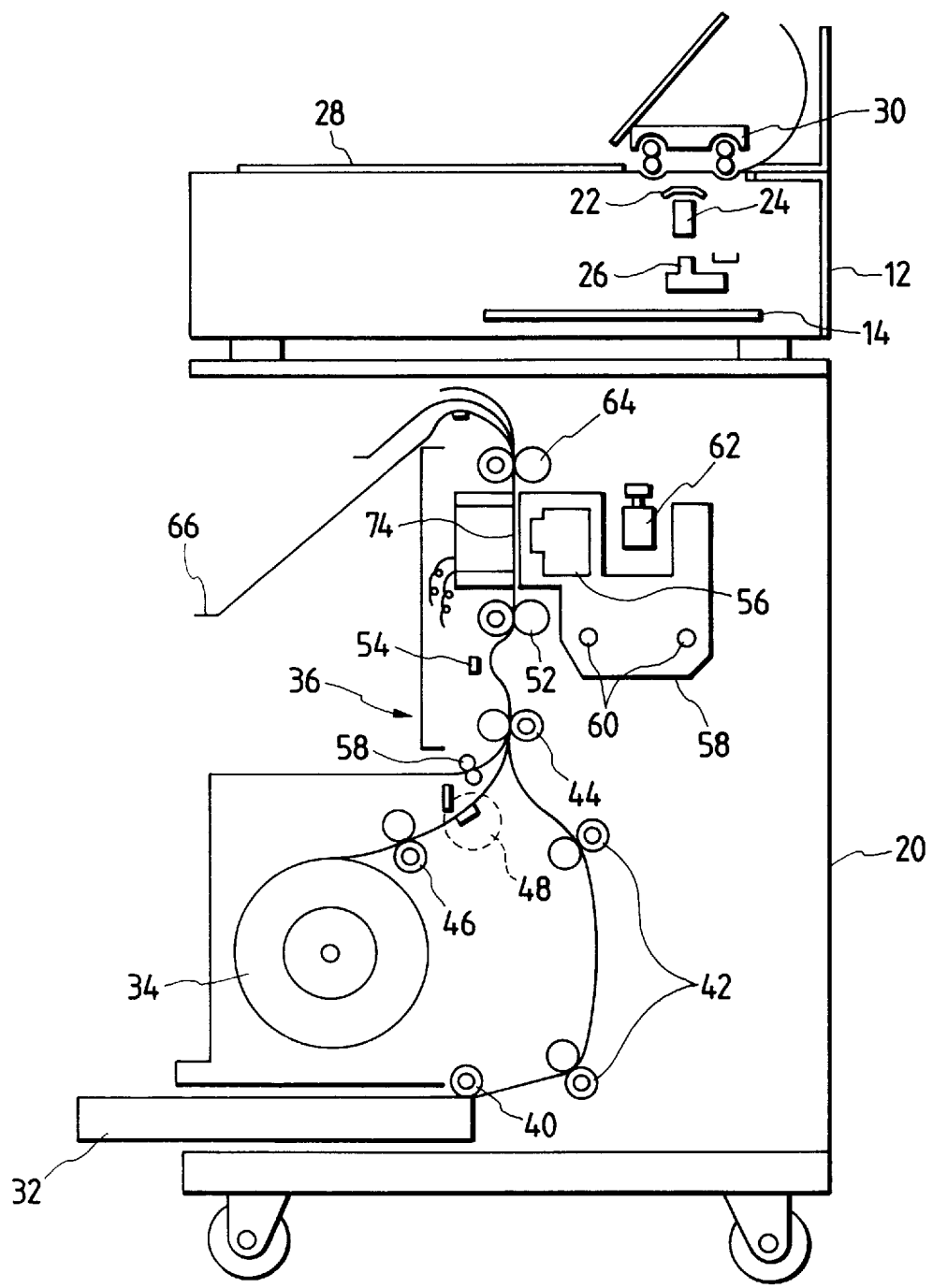
FIG. 2 shows a sectional view illustrating an internal construction of the digital color copying apparatus.

FIG. 2 shows a side sectional view of an internal construction of the color digital copying apparatus 10 shown in FIG. 1.

[Reader]

A construction of the reader 12 of the copying apparatus 10 is first explained.

In the reader 12, an image of a document sheet placed on a document sheet table, a projected image by a projector or an image of a document sheet fed by a sheet feed mechanism 30 is read by an exposure lamp 22, a lens 24 and an image sensor 26 capable of reading a line image in full color (a CCD sensor in the present embodiment). Then, various image processing to the image information read by the reader 12 are conducted by the reader 12 and the controller 14, and the image processed information is then sent to the printer 20 and recorded on the recording sheet.

[Printer]

In the printer 20, the recording sheets are selectively supplied by a sheet feed cassette 32 which accommodates cut sheets of a small standard size (sizes A4 to A3 in the present embodiment) and a rolled sheet 34 for large size recording (sizes A2 to A1 in the present embodiment). The sheet feed is started by a print start command from the control unit 14 and the sheet is first fed to a position of a first roller 44 along the following path. In the present embodiment, manual sheet feed (sheet feed externally of the apparatus) to manually feed the recording sheet one by one from a manual insertion port 34 along a sheet feeder cover 38 is permitted.

For the recording sheet feed from the sheet feed cassette 32 mounted on the printer 20, a pickup roller 40 for taking out the cut sheet one at a time from the sheet feed cassette 32 is arranged. Thus, by rotating the pickup roller 40, the top record sheet accommodated in the sheet feed cassette 32 is taken out and it is fed to a cut sheet feed roller 42 and further fed to the first sheet feed roller 44 by the roller 42.

On the other hand, for the rolled sheet 34, it is continuously fed by a rolled sheet feed roller 46 and the rolled sheet is cut to a standard length by a cutter 48 and it is fed to the position of the first sheet feed roller 44.

Similarly, for the manual sheet feed from the manual insertion port 36, the manually inserted recording sheet is fed to the first sheet feed roller 44 by a manual insertion roller.

The pickup roller 40, the cut sheet feed roller 42, the rolled sheet feed roller 46, the first sheet feed roller 44 and the manually insertion roller are constructed to be driven by a sheet feed motor not shown (a DC servo motor in the present embodiment) and turned on and off by solenoid clutches associated with the respective rollers.

The recording sheet selectively fed through one of the above sheet feed paths is fed to the position of the first sheet feed roller 44. In order to eliminate the skew of the recording sheet, a predetermined amount of loop is formed in the recording sheet and then the first sheet feed roller 44 is turned on, and then the recording sheet is fed to a second sheet feed roller 52. Between the first sheet feed roller 44 and the second sheet feed roller 64, the recording sheet is looped by the predetermined amount to form a buffer in order to assure the exact sheet feed between a second sheet feed roller 64 arranged above a recording head 56 and a second roller 52 arranged below the recording head 56. A buffer amount sensor 54 for detecting the amount of buffer as an amount of loop of the recording sheet is arranged in the buffer. By forming the buffer in the feed path of the recording sheet, a load to the second sheet feed roller 64 and the second roller 52 when the large size recording sheet is fed is reduced and the exact sheet feed is attained.

When the printing is to be made by the recording head 56 in the printer 20 having the recording sheet feed system constructed as described above, a scanning carriage on which the recording head 56 is mounted is reciprocally driven to the front and back sides of the drawing along a carriage rail 60 by a scan motor 62 to conduct the scan of the recording sheet in the main scan direction. In the forward scan, the image is printed on the recording sheet by the recording head 56, and in the backward scan, the feed in the sub-scan is conducted to feed the recording sheet by a predetermined distance by the second sheet feed roller 64.

The feed distance in the sub-scan direction is defined as a constant distance as defined below, and it is set in the present embodiment to a length corresponding to a width of the recording head 56 in the sub-scan direction, that is, a length corresponding to a width of arrangement of suction ports formed over a plane of a platen 74 facing the recording head 56. The suction ports serve to contact the recording sheet to the platen 74. In the feed control of the recording sheet by the scan motor 62 in the backward scan, the recording sheet is controlled to always have a predetermined amount of buffer by detecting the amount of buffer of the recording sheet through the buffer amount sensor 54. The recording sheet having the image thus recorded thereon is ejected to a sheet eject tray 66 and the print process is completed.

Figure 3:
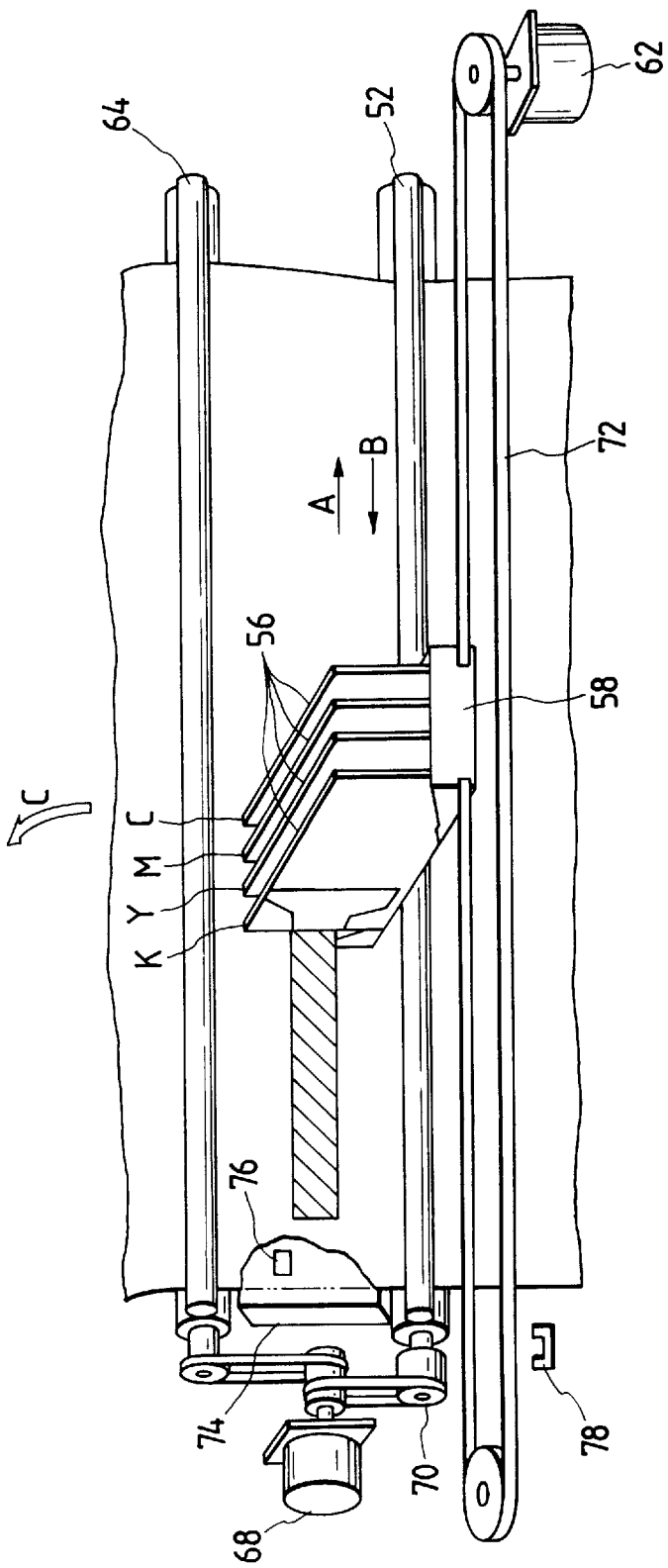
FIG. 3 shows a mechanism of a periphery of a carriage of the digital color copying apparatus.

Referring to FIG. 3, a construction in the periphery of the scanning carriage 58 is explained. In FIG. 3, numeral 68 denotes a sheet feed motor as a drive source to intermittently feed the recording sheet in the sub-scan direction. The amount of rotation of the sheet feed motor 68 may be arbitrarily set and changed and the sheet feed motor 68 drives the second roller 52 through the second sheet feed roller 64 and a second sheet feed roller clutch 70. The scanning motor 62 is a drive source for reciprocally scanning the scanning carriage 58 in the main scan direction shown by arrows A and B through a scan belt 72.

In the present embodiment, pulse motors are used for the sheet feed motor 68 and the scan motor 62 because of the requirement for the exact sheet feed control for any feed amount. In the present embodiment, a sheet retainer, not shown, is arranged at a position facing the bottom end of the platen 74 and the sheet retainer is fixed to the platen during the scan of the scanning carriage 56 to prevent the movement of the recording sheet.

When the recording reaches the second sheet roller 52, the second sheet feed roller clutch 70 and the sheet feed motor 68 are turned on and the recording sheet is fed on the platen 74 until the leading edge thereof is pinched by the pair of sheet feed rollers 64. The fed recording sheet is detected by the sheet sensor 76 when it is fed through the platen 74. The sensor information is utilized for the position control and the jam control. When the leading edge of the recording sheet reaches the second sheet feed roller 64, the second sheet feed roller clutch 70 and the sheet feed roller 68 are turned off, and the inner space of the platen 74 is given a negative pressure by the actuation of a suction motor, not shown, to start the suction operation. By this suction operation, the recording sheet is contacted onto the platen 74. The sheet retainer described above also serves to secure the recording sheet to the platen.

Prior to the image print operation to the recording sheet, the scanning carriage 58 is moved to the position at which the home position sensor 78 is mounted, and it is forwardly scanned in the direction A. In the forward scan, the inks of cyan C, magenta M, yellow Y and black K are discharged from the recording head 56 at predetermined positions to record (print) the image. When the recording operation of a predetermined length of image in the main scan direction is completed, the direction of rotation of the scan motor 62 is reversed, that is, driven in the direction B to start the backward scan. The scan motor 62 is driven in reverse until the scanning carriage 58 returns to the position of the home position sensor 78.

During the backward scan, the sheet feed motor 68 is driven to drive the sheet feed roller 64 so that the sheet is fed by the sub-scan length recorded by the recording head 56 shown by C (width of the recording head). In the present embodiment, the amount of sheet feed, that is, the distance of movement in the sub-scan direction is set not only to the constant distance corresponding to the width of the recording head 56 but also it may be set to the distance of one side movement defined by the final line width.

In the present embodiment, the recording head 56 is the ink jet recording head and a total of 256 nozzles are assembled for each of the colors Y, M, C and K. Any color printed in one scan may be selected. In the present embodiment, the recording head 56 is of the type to discharge the ink droplets from the nozzles by causing a status change in the ink by utilizing thermal energy.

On the other hand, when the scanning carriage 58 stops at the home position defined by the home position sensor 78, the recovery operation of the recording head 56 is conducted. The recovery operation is for the stable recording operation and prevents the variation at the start of discharge caused by the change in the viscosity of the ink remaining in the nozzles of the recording head 56. In this process, a pressure is applied to each nozzle of the recording head 56 in accordance with preprogrammed conditions such as sheet feed time, temperature in the apparatus and discharge time, to conduct idling discharge of the ink from the nozzles.

The above operation is repeated to record a desired image on the entire recording sheet.

Figure 4:
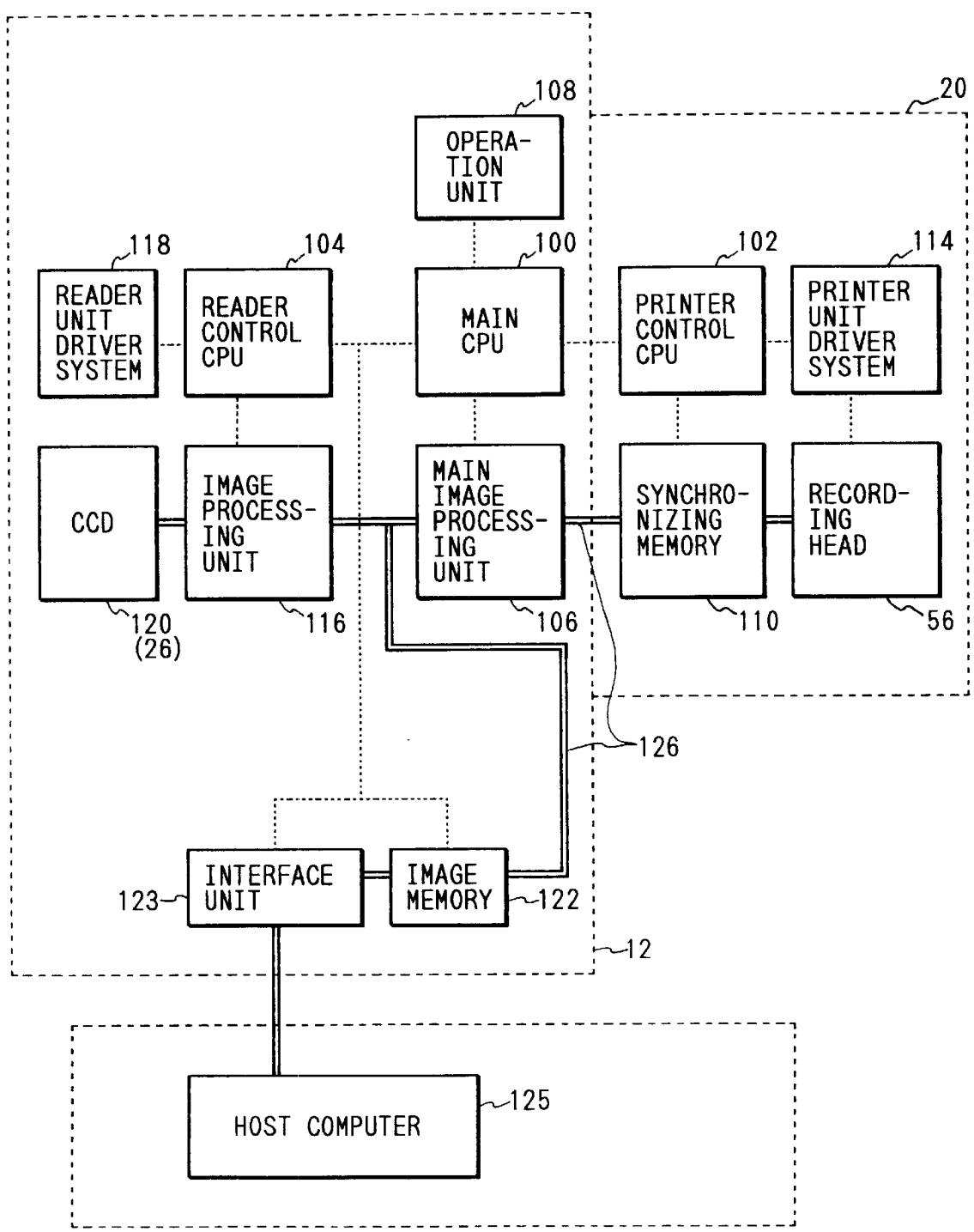
FIG. 4 shows a block diagram of a configuration of a control unit of the digital color copying apparatus.

Referring to FIG. 4, processing and control of the image signal of the control system in the digital color copying apparatus 10 of the present embodiment are explained.

In FIG. 4, numeral 100 denotes a main CPU for controlling the overall apparatus. Connected to the main CPU 100 are a printer control CPU 102 for controlling the printer operation, a reader control CPU 104 for controlling the read operation, a main image processing unit 106 for processing the image, a console unit (or operation unit) 108 which serves as an input unit for an operator, an interface (I/F) unit 123 for exchanging image data and information with the external unit (computer 125 in the present embodiment) and an image memory unit 122 for storing the image data sent through the I/F 123. The printer control CPU 102 and the reader control CPU 104 control the operations of the printer and the reader, respectively, and they are in the master-slave relation with the main CPU 100.

The main image processing unit 106 conducts the image processing such as masking, black extraction, binarization and γ-correction. A synchronous memory 110 is connected to the printer control CPU 102 and the main image processing unit 106. The synchronous memory 110 serves to absorb the variation in time of the input operation and correct the delay due to the mechanical arrangement of the recording head. The output of the synchronous memory 110 is connected to the recording head 56. The printer control CPU 102 is connected to a printer drive unit 114 which controls the input drive of the printer unit. The reader control CPU 104 is connected to an input image processing unit 116 which conducts corrections necessary in the read unit such as shading correction, color correction and γ-correction and it is also connected to a reader drive unit 118 which controls the input drive of the reader. A CCD line sensor 120 (corresponding to image sensor 26 in FIG. 2) is connected to the input image processing unit 116, which is in turn connected to the main image processing unit 106. The reader 12 comprises the main CPU 100, the reader CPU 104, the main image processing unit 106, the console unit 108, the input image processing unit 116, the reader drive unit 118 and the CCD line sensor 120 as the image sensor.

The printer 20 comprises the printer control CPU 102, the synchronous memory 110, the recording head 56 and the printer drive unit 114. The synchronous memory serves to absorb the variation in time of the input operation and correct the delay due to the mechanical arrangement of the recording head. The synchronous memory can store one band of image and the stored image can be read at any time for each color. The print color is selected by the printer control CPU 102.

Figure 6:
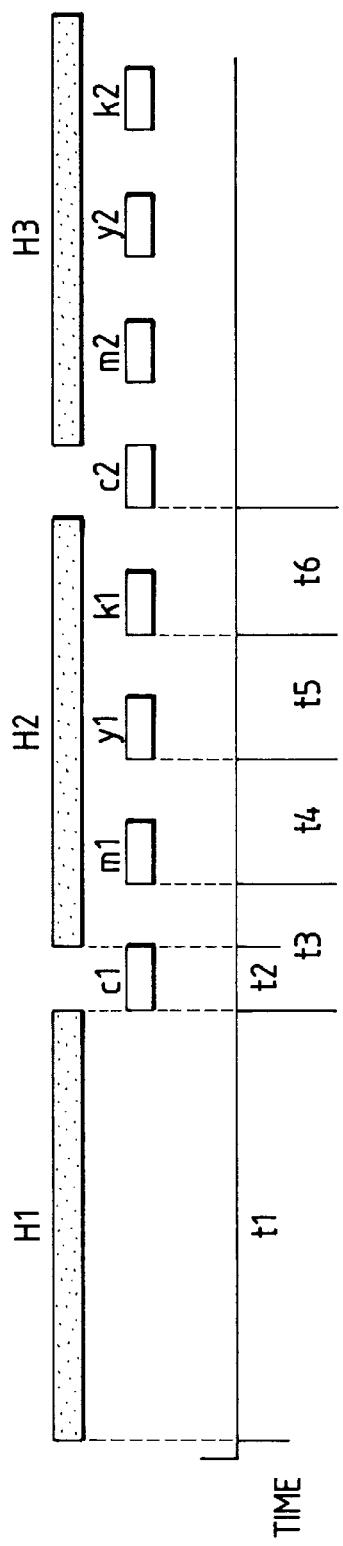
FIG. 6 shows a timing of a color image forming process.

Referring to a timing chart of FIG. 6, the image forming process in the present embodiment is now explained. It is assumed that optimum print process conditions for the image to be printed are (1) printing one color at a time, and (2) a print interval between different colors is as long as possible. An image forming process which complies with those conditions is determined. FIG. 6 shows a timing chart of the image forming process. In FIG. 6, Hx represents the image transfer from the x-th band image host to the image memory 122, and cx, mx, yx and kx represent the print scan of the respective colors of the image in the x-th band. A time t2 required for cx is equal to that of mx, yx and kx, and a time t1 required for Hx is equal for x=1, 2, 3 and n. Since t1>>t2 in general, the printing of the respective colors are allotted to comply with the above condition during the image transfer time.

This is explained sequentially from the beginning of the time chart. First, one band of image is transferred from the host computer 125 (H1). After the completion of the transfer, the c data of the first band is printed (c1). The entire image data of the image memory 122 is transferred to the synchronous memory 110 and only the c image is read and printed by the control of the printer control CPU 102. The t3 time after the start of c1, the m image is now read from the synchronous memory 110 and printed. The time t3 is a quarter of the time from the start of the printing of c1 to the end of the transfer of one band of image of H2 and the start of the printing of c2. Accordingly, the intervals t3, t4, t5 and t6 from m1 to y1, y1 to k1, k1 to c2, respectively, are equal. Since the image transfer time is substantially determined by data such as the image capacity of one band, the performance of the transferring computer and the type of the I/F, the total time required for the printing of one band can be calculated. By repeating the above process, the entire image is formed.

Detail of a copy sequence carried out by the main CPU 100, the printer control CPU 102, the reader control CPU 104 and the host computer 125 in the present embodiment is now explained.

Figure 5:
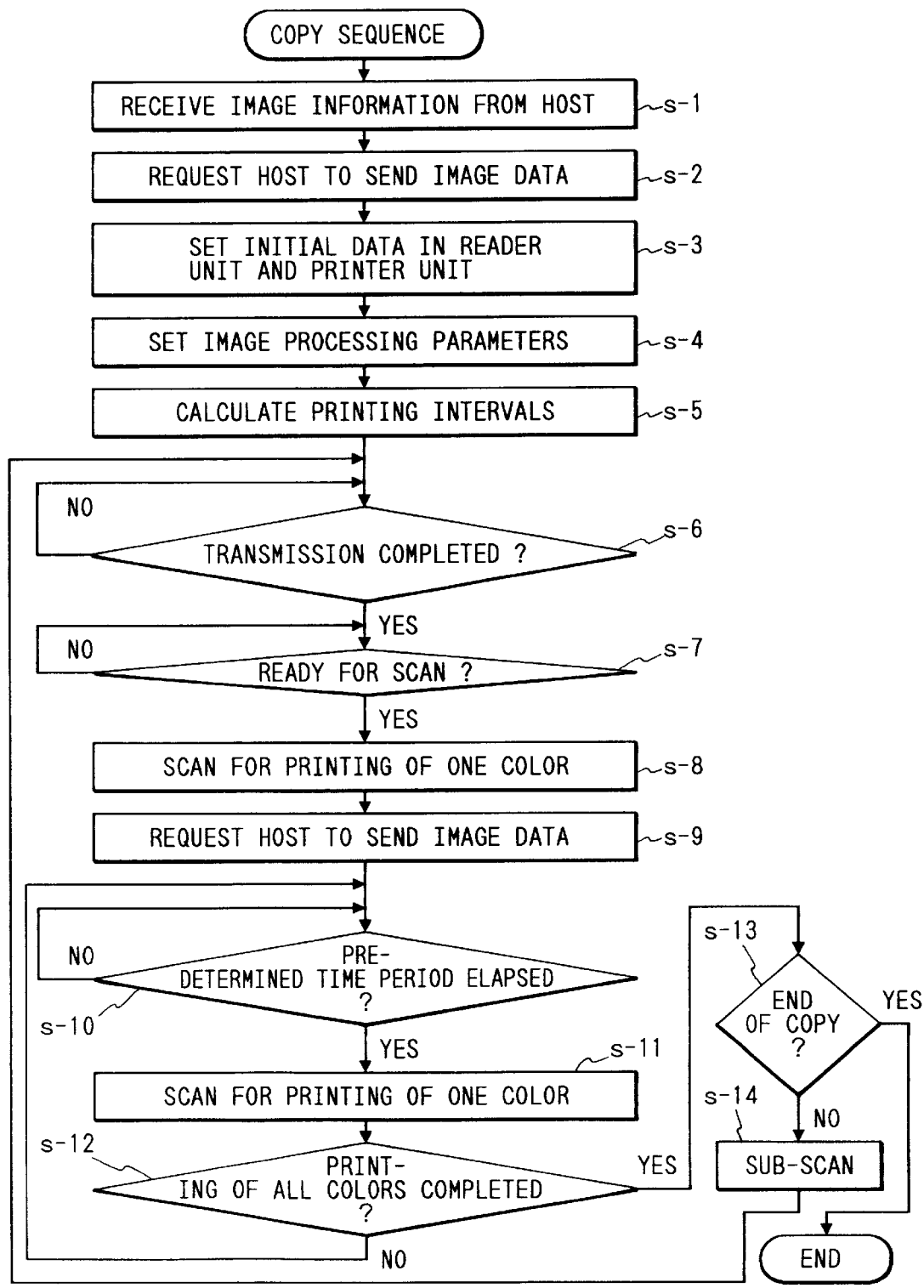
FIG. 5 shows a flow chart illustrating a control flow in recording a color image.

FIG. 5 shows a flow chart illustrating a copy sequence in a first embodiment. When an image print request command is sent from the host to the main CPU 100 through the I/F unit 123, a sequence task program is called and the main CPU 100 starts the process from a step s-1.

In the step s-1, the image signal sent from the host computer 125 is received. The information necessary to form the image such as a size of the entire image, a size of the image sent in one transfer and a type of host are sent. In the following step s-2, an image send request command is sent to the host. In response thereto, the host transfers one band of image which is stored in the image memory 122 through the I/F unit 123.

The sequence proceeds and in a step s-3, the data necessary for the initialization in the reader 12 and the printer 20 are sent to the reader control CPU 104 and the printer control CPU 102 and the data are set. In a step s-4, the parameters necessary for the image processing are set.

In the following step s-5, the optimum print intervals of the respective colors are calculate in the manner described above.

The transfer time can be calculated based on the information sent from the host such as the type of host, the type of the connected I/F unit and the capacity of one band of image, and the information previously held by the main CPU 100.

In a step s-6, the completion of the transfer of the image from the host computer 125 is checked, and in the following step s-7, whether the reader and the printer are ready or not is determined, and one color of printing is conducted in a step s-8. After the completion of the printing, in a step s-9, the transfer of the next one band of image to the image memory 122 is requested to the host computer 125. In a step s-10, the elapse of the predetermined time (t3 in FIG. 6) after the completion of the previous scan is monitored. After the elapse of the predetermined time, in a step s-11, the next one color of printing is conducted. In the following step s-12, whether the printing for all colors in the band is completed or not is determined, and if the decision is NO, the process returns to the step s-10, and if YES, the process proceeds to a step s-13 to determine whether the image forming for all bands is completed or not. If the decision is NO, the process proceeds to a step s-14 to conduct the sub-scan of the recording medium and returns to the step s-6. If the decision is YES, the copy sequence is terminated.

In this manner, the printing of the respective colors are allotted at the appropriate interval in the transfer time so that the high quality image is formed even on the special recording medium without lowering the throughput of the image formation.

[Second Embodiment]

Figure 7:
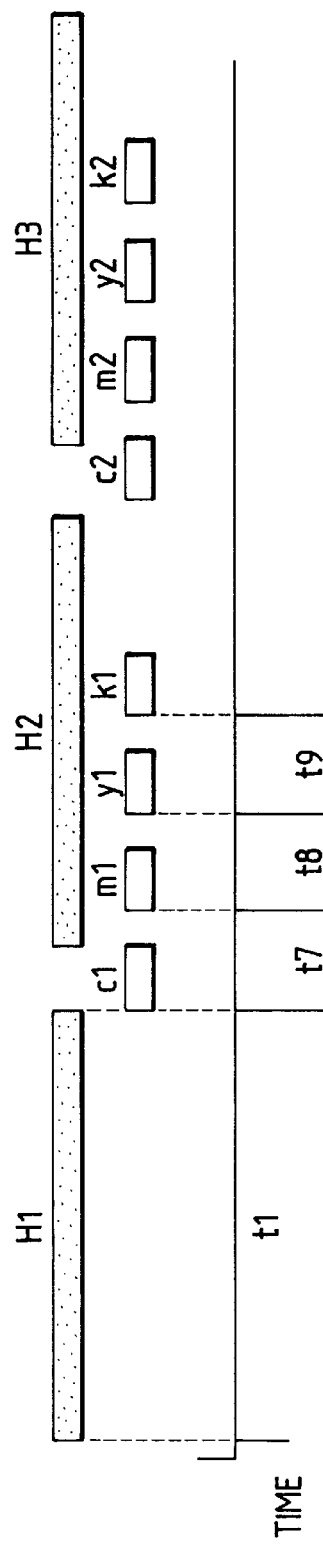
FIG. 7 shows a timing of a color image forming process.
Figure 8:
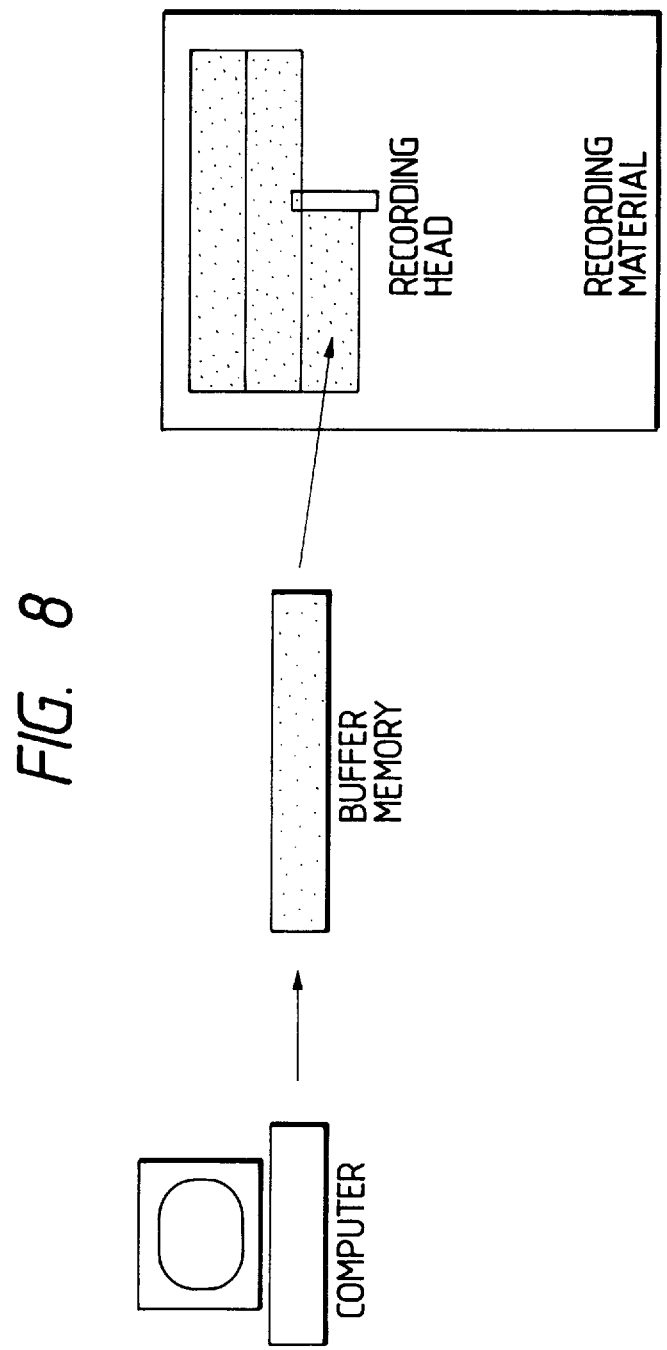
FIG. 8 illustrates a prior art computer image forming apparatus.

In the previous embodiment, the present invention is applied to the process for printing one band of image at the equal interval for each of the four colors, but the present invention should not be limited thereto. It may be printed in two runs by two colors. The print interval need not be a full transfer time but the next printing may be conducted after the elapse of the optimum interval (t7) as shown in FIG. 7. Further, the image forming process may be switched in accordance with the selected recording material or the process may be switched in accordance with the type of image (high density image or other).

[Third Embodiment]

In the previous embodiment, the image transfer time is calculated based on the capacity of one band of image, the type of the I/F unit and the type of host. Alternatively, the time required for the transfer of the first band of image (H1 in FIG. 6) may be measured by the CPU 100 and the print interval may be determined based on that time. The present invention is not limited by the calculation method of the image transfer time.

[Fourth Embodiment]

In the previous embodiment, the present invention is applied to the binary recording image forming apparatus which represents one pixel by one ink dot although the present invention may be applied to a recently proposed multi-value ink jet image forming apparatus which represents one pixel by a plurality of ink dots. In this case, one band of image is printed a plurality of times. For example, for four-value printing, a first value is printed in a first scan, a second value is printed in a second scan, and a third value is printed in a third scan to form the image by the sequential multi-scan system.

The present invention may be applied to such a multi-scan system. In this case, instead of printing for each color as it is in the previous embodiment, the image is formed by allocating the multi-scan at an appropriate interval in the image transfer interval.

[Fifth Embodiment]

In the previous embodiment, one band of image is held in the image memory 122. Alternatively, an image memory which stores only one color of image may be used. It is applicable to the process which forms the image for each color at the equal interval as described in the first embodiment, and it is advantageous in reducing the memory cost and suppressing the increase of the circuit scale.

[Sixth Embodiment]

In the previous embodiment, the present invention is applied where the image is transferred from the host. Alternatively, the present invention is applicable where the image read by the reader is printed. For an image density which may cause a problem with a conventional image forming process, a predetermined mode is selected and the print process may be controlled such that the optimum image is formed by taking an interval between bands. In this case, the throughput of the image formation is lowered but the image quality is effectively improved.

Thus, in forming one band of image by scanning the recording head having the predetermined width in the sub-scan direction a plurality of times in the main scan direction, the scans in one band are conducted at the optimum timing so that the high quality image can be formed even on the recording medium such as the OHP film which has a low absorption factor of the recording material such as ink. When the image transferred from the external unit such as the computer is to be printed, the scan timing may be optimized by the transfer time of the image so that the high quality image can be formed without lowering the throughput of the image formation.

In the above embodiments, the present invention is applied to the apparatus which uses the ink jet recording head for forming the flying liquid droplets by utilizing the thermal energy. The typical construction and the operational principles are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the bubble generation, development and contraction of the bubbles, the liquid (ink) is ejected through a discharge port to produce at least one droplet.

The driving pulse signal is preferably such as disclosed in U.S. Pat. No. 4,463,359 and U.S. Pat. No. 4,345,262. In addition, the temperature rise rate of the heating surface is preferably such as those disclosed in U.S. Pat. No. 4,313,124 so as to achieve excellent recording.

The structure of the recording head may be those shown in U.S. Pat. No. 4,558,333 and U.S. Pat. No. 4,459,600 in which the heating portion is disposed at a bent portion, as well as the structure (linear or orthogonal liquid passage) of the combination of the ejection outlet, liquid passage and the electro-thermal transducer disclosed in the above-mentioned patents.

In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

In addition, the present invention is applicable to a replaceable chip type recording head which is connected electrically with the apparatus and can be supplied with the ink when it is mounted in the main assembly, or to a cartridge type recording head having an integral ink container.

The provisions of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

As regards the recording mode of the recording apparatus, the present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied.

In addition, the temperature rise due to the thermal energy is positively prevented by consuming it for the state change of the ink from the solid state to the liquid state. Other ink is solidified when it is left, to prevent the evaporation of the ink. An another case, the application of the recording signal producing thermal energy, the ink is liquefied, and the liquefied ink may be discharged. Another ink may start to be solidified at the time when it reaches the recording sheet. The present invention is also applicable to the ink which is liquefied by the application of the thermal energy. Such ink may be retained in a liquid state or a solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The recording apparatus of the present invention may be applied to the copying apparatus combined with the reader as described above as well as an output terminal of an information processing apparatus such as a wordprocessor or a computer or the like, or as a facsimile machine having information sending and receiving functions.

The present invention is also applicable to an apparatus using a recording head of a type which discharges the ink droplet by using a piezo-electric element.

As described above, since the record operation of one band of image data and the transfer of the next band of image data are conducted in parallel and the record scan of one band of image is conducted in the time interval allotted in accordance with the time required to transfer one band of image data, a plurality of record scans can be conducted at the appropriate timing in the transfer of the next band image data and the high quality image can be recorded without lowering the throughput.

What is claimed is:

1. An ink jet recording method for recording on a recording medium one band of an image corresponding to image data received by receiving means by scanning ink jet recording means for providing ink and having a predetermined recording width a plurality of times in a main scan direction, comprising the steps of:

determining a timing to conduct each record scan of a plurality of record scans in recording one band of an image in accordance with a time required to transfer one band of image data to the receiving means; and conducting the plurality of record scans at the timing determined in said determining step to record a current band of the image in parallel with a transfer of a next band of image data, each record scan being conducted at a time interval allotted in accordance with the time required to transfer one band of image data to the receiving means.

2. An ink jet recording method according to claim 1, wherein said recording means includes a plurality of recording heads for providing ink of different recording colors and records images of different colors by ejecting ink from a different recording head in each record scan.

3. An ink jet recording method according to claim 1 wherein said determining step determines said timing to conduct each record scan at an equal time interval.

4. An ink jet recording method according to claim 2, wherein each record scan forms a monochromatic image.

5. An ink jet recording apparatus according to claim 2, wherein each record scan forms a multi-color image.

6. An ink jet recording method according to claim 1, further comprising the step of discharging a plurality of ink droplets from the ink jet recording means to form one pixel during a plurality of times of record scans to thereby form a multi-value record.

7. An ink jet recording method according to claim 1, further comprising the step of discharging the ink droplets from the ink jet recording means by utilizing thermal energy to change a state of the ink.

8. An ink jet recording apparatus for recording one band of an image on a recording medium by scanning ink jet recording means for providing ink and having a predetermined recording width a plurality of times in a main scan direction, comprising:

receive means for receiving transferred image data;

storage means for storing image data received by said receive means;

determination means for determining a timing to conduct each record scan of a plurality of record scans in recording one band of an image in accordance with a time required to transfer one band of image data to said receive means;

control means for controlling said ink jet recording means to conduct each record scan of the plurality of record scans at the timing determined by said determination means in parallel with a transfer of a next band of image data to said receive means, each record scan being conducted at a time interval allotted in accordance with the time required to transfer one band of image data to said receive means; and feed means for feeding said recording medium by an amount corresponding to the predetermined recording width after completion of said plurality of record scans in one band of an image.

9. An ink jet recording apparatus according to claim 8, wherein said determination means determines said timing such that each record scan is performed for an equal time interval.

10. An ink jet recording apparatus according to claim 8, wherein said ink jet recording means includes a plurality of recording heads for recording with different recording colors, and said control means controls said ink jet recording means to record images of different colors by ejecting ink from a different one of the plurality of recording heads in each record scan.

11. An ink jet recording apparatus according to claim 10, wherein said control means controls said ink jet recording means to record a monochromatic image by ejecting ink from a single recording head in each record scan.

12. An ink jet recording apparatus according to claim 10, wherein said control means controls said ink jet recording means to record a multi-color image by ejecting ink from a plurality of recording heads in each record scan.

13. An ink jet recording apparatus according to claim 8, wherein said ink jet recording means discharges the ink droplets by utilizing thermal energy to change a state of the ink.

* * * * *

UNITED STATES PATENT AND TRADEMARK OFFICE
CERTIFICATE OF CORRECTION

PATENT NO. : 5,812,154
DATED : September 22, 1998
INVENTOR(S) : KEIJU KUBOKI

It is certified that error appears in the above-identified patent and that said Letters Patent is hereby corrected as shown below:

<u>COLUMN 9</u>

Line 66, "An" should read --In--.

Signed and Sealed this

Twenty-ninth Day of June, 1999

Attest:

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,812,154

DATED : September 22, 1998

INVENTOR(S) : KEIJU KUBOKI

It is certified that error appears in the above-identified patent and that said Letters Patent is hereby corrected as shown below:

IN THE TITLE [54] and COLUMN 1

Title should read --INK JET RECORDING APPARATUS FOR DETERMINING A TIMING FOR A RECORD SCAN IN ACCORDANCE WITH A TIME REQUIRED TO TRANSFER ONE BAND OF IMAGE DATA, AND RECORDING THE IMAGE DATA--.

Signed and Sealed this

Twenty-fourth Day of August, 1999

*Attest:*

Q. TODD DICKINSON

*Attesting Officer*     *Acting Commissioner of Patents and Trademarks*